W. R. WILLIAMS.
VEHICLE SUSPENSION.
APPLICATION FILED NOV. 7, 1921.
1,427,992.
Patented Sept. 5, 1922.
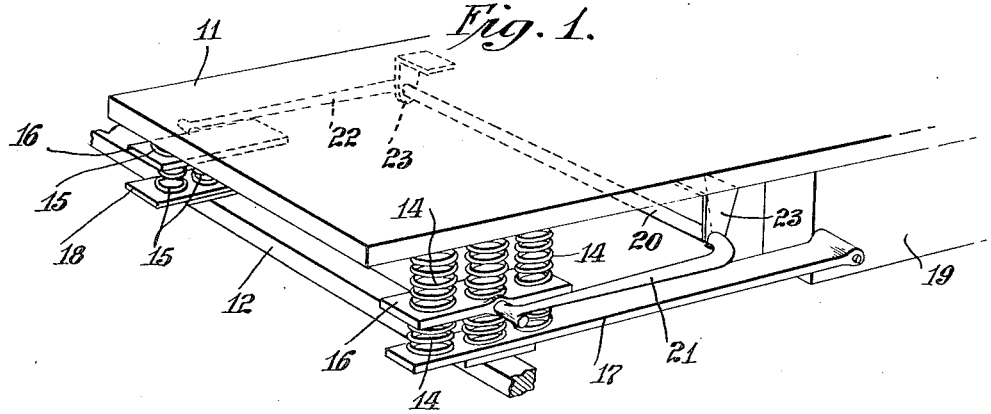
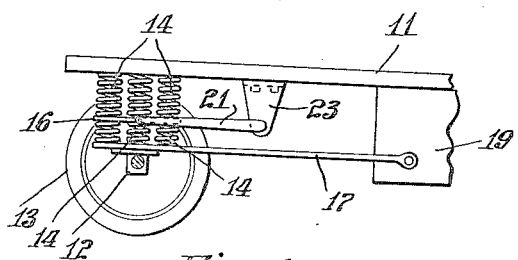
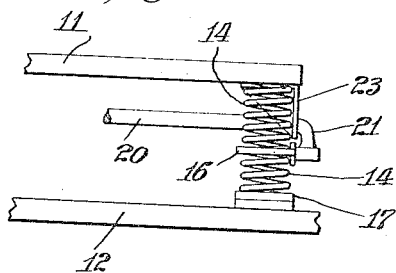
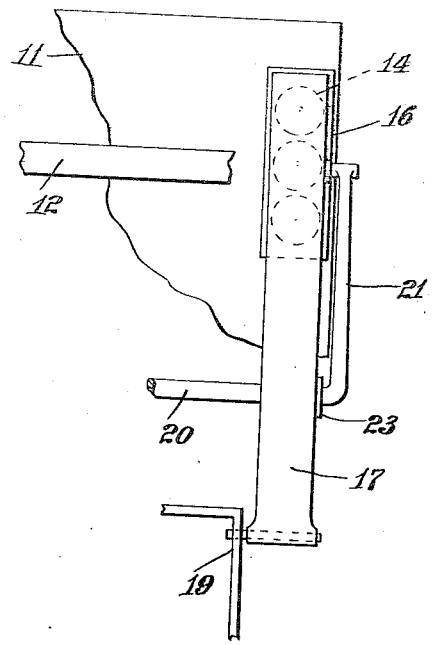
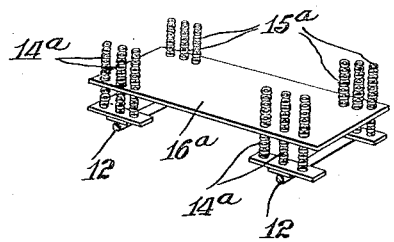
Inventor
William R. Williams,
By his Attorney
Wm J. Dolan.

Patented Sept. 5, 1922.

1,427,992

UNITED STATES PATENT OFFICE.

WILLIAM R. WILLIAMS, OF PHILADELPHIA, PENNSYLVANIA.

VEHICLE SUSPENSION.

Original application filed January 22, 1912, Serial No. 672,768. Divided and this application filed November 7, 1921. Serial No. 513,354.

*To all whom it may concern:*

Be it known that I, WILLIAM R. WILLIAMS, a citizen of the United States, residing at Philadelphia, county of Philadelphia, and State of Pennsylvania, have invented certain new and useful Improvements in Vehicle Suspensions, of which the following is a specification.

The subject-matter hereof constitutes a division of a co-pending patent application, filed on the 22nd day of January, 1912, Serial Number 672,768. The improvements herein shown and described, like those covered by the companion case, may be applied to vehicles generally, but are particularly applicable to motor cars, of greater or less weight, designed to move at high speed.

Objects of the invention are to provide an improved vehicle suspension in which the degree of action of the elastic elements or springs usually employed may be greatly increased without in any way decreasing the stability of the vehicle; which shall be simple, durable, and economical in construction as well as highly efficient in operation; and whose parts shall be few, accessible, and easy of application. These and other objects of the invention will in part be obvious and in part be more fully explained in the following description.

The invention consists in the novel improvements, parts, combinations, and features of construction herein shown and described.

In the accompanying drawings, which are referred to herein and form part hereof, are illustrated various embodiments of the invention, the same serving in connection with the description herein to explain the principles of the invention.

Of the drawings:

Fig. 1 is a perspective view showing part of the frame or chassis of a motor car, with an embodiment of the invention applied thereto;

Fig. 2 is a side elevation of the same structure, to which has been added one of the car wheels and the journal thereof, the latter appearing in section;

Fig. 3 is an end view of the elastic elements incorporated in the form of construction represented by the preceding figures;

Fig. 4 is a bottom plan view of the same construction;

Fig. 5 is a perspective view showing the invention in a modified form.

As ordinarily constructed, a motor car is provided with springs to give a certain degree of ease of motion to the vehicle. In order, however, to insure the stability of the suspended portion or body of the vehicle, these springs must be very rigid. This rigidity constitutes a serious defect in motor vehicles wherein a high degree of ease of motion is desirable but which is prevented by this rigidity of the springs or elastic elements. The defect here alluded to is remedied through the various arrangements of springs and stress-controlling devices incorporated in the diverse forms of construction hereinafter described.

Referring first to Figures 1 to 4 of the drawings, the form of the invention therein exemplified is shown as applied to a frame 11, which may be the chassis of a motor car or similar vehicle having transversely stable elements of support or axles, as 12, carried by wheels 13, in a usual manner. The frame or chassis 11 is mounted upon helical springs 14 and 15, or equivalent elastic elements, arranged in sets fore and aft at both sides of the vehicle, each set being designed to act as a unit. While they may vary in number, type, and arrangement and be united in any suitable way, as shown these sets of elastic elements include, in each instance, three vertically disposed springs, interconnected by a rigid plate 16, through which the springs are separately passed and adjusted individually by screwing them up or down in a vertical direction. The plate 16 is horizontally arranged transversely of the springs in each set. Opposite sets of springs sustain the body 11 of the vehicle on their upper ends, while their lower ends rest upon supporting members 17 and 18, laid crosswise of the subjacent axle 12. The members 17 and 18 are alike and made both to extend inwardly, forward or rearward of the axle as the case may be, in order that they may serve also as reach bars connecting the axle to the vehicle frame, or to some depending part thereof, as suggested at 19. The elements last referred to, namely, the reach bars, operate to maintain the longitudinal positions of the respective axles. The sets of springs and the combined supporting members and reach bars, it is understood, are duplicated on opposite sides of the vehicle.

The lower sections of the springs, beneath the plates 16, may be taken to indicate the degree of rigidity required in the springs, as heretofore used, to insure stability of the vehicle. To give a desired degree of ease of motion to the vehicle, when running at high speed or upon encountering inequalities of road surface, longer or more flexible springs may be used, the increase in length or flexibility being represented by the upper spring sections, above the plates 16. With springs of this degree of flexibility applied in an ordinary manner, however, while great ease of motion would be imparted, the suspended portion of the vehicle would tilt laterally or sway from side to side to a very dangerous extent upon any shifting of the load or upon encountering inequalities in the road surface. But, this extreme length of spring or degree of action of the elastic elements can be employed, without any attending excessive lateral tilting of the body of the vehicle, if the suspension is so constructed or arranged that the instability, which would otherwise be caused by the addition of the extra springs or amplification of the elastic means, is eliminated by causing portions of oppositely disposed elastic elements to act in unison. For example, in the embodiment of the invention illustrated in Figs. 1 to 4, the transverse plates 16, positioned intermediate of the springs 14, 15, in each set, are joined one to another on opposite sides of the vehicle by means of a controlling member, preferably made in the form of a yoke hinged or pivotally attached to the suspended portion of the vehicle. As shown, the yoke includes a main central part 20, and arms or levers 21, 22, extending therefrom in parallelism toward one end of the vehicle frame. The part 20 is disposed transversely of the frame or chassis on the under side of the same, and fitted in bearings 23, in which the said part is partially rotated, that is, receives a rocking motion, whenever the said arms or levers are raised or lowered, owing to pressure exerted thereon by the plates 16, as they are acted upon by the springs or resilient elements thereto attached. It will be observed that the outer ends of the arms or levers 21, 22 of the yoke are pivotally secured to the plates 16, at that point intermediate of the springs which marks the limit of flexibility or allowable spring action that can be given to a spring as heretofore used, namely, the point marking the division between the upper and lower portions, respectively, of the spring sets. By employing the present invention, the additional degree of flexibility indicated by the spring sections above the dividing plates 16 may be imparted without affecting the transverse stability of the vehicle. It will be noted that this is accomplished by maintaining in the elastic elements on the opposite sides of the vehicle, as shown the several sets of springs, a predetermined relation between the points of demarcation in the respective groups of springs between stability and instability, that is, the points marking the limits of flexibility in the springs, as heretofore used, at which the body of the vehicle would be stable when moving at high speed. Such points, necessarily, are determined by trial, and attained by screwing the springs up or down through the plates 16, pivotally attached to the arms or levers of the hinged yoke or controlling member.

This idea is very clearly set forth in Fig. 5, which represents a slightly modified form of the invention, wherein the various groups of springs, designated by the reference characters $14^a$ and $15^a$, are connected by a platform $16^a$ at the said limiting points, the upper portions of the springs being designed to receive another platform (not shown). Fig. 5, it may be noted, is employed principally to demonstrate or visualize, so to say, the transversely parallel action obtained through the use of the suspending instrumentalities embodying the present invention.

It is manifest that a vehicle suspension constructed in accordance with this invention will carry out the objects of the invention as hereinbefore mentioned, while possessing other advantages which will be apparent to those skilled in the art.

The invention in its broader aspects is not limited to the precise constructions shown and described nor to any particular construction by which the same may be carried into effect, as many changes may be made in the details without departing from the main principles of the invention and without sacrificing its chief advantages.

I claim:

1. A vehicle suspension including, in combination, a pair of elastic means arranged on opposite sides of the vehicle, a transversely disposed rigid member rotatably attached to the suspended portion of the vehicle on a line substantially parallel therewith, and levers extending from said member intermediately of portions of said elastic means.

2. A vehicle suspension including in combination, springs each acting in opposite directions and designed to support the vehicle frame from opposite sides thereof, a stress-transmitting member hinged in transversely parallel relation to said frame, and levers extending from said member into connection with said springs at predetermined points of demarcation between stability and instability.

3. A vehicle suspension including, in combination, supporting springs located on opposite sides of the vehicle, means dividing said springs into sections of required resiliency, a rigid member hinged to the suspended portion of the vehicle in transversely parallel relation to the same, and stress-transmitting connections between said dividing means and said member.

4. A vehicle suspension including, in combination, helical springs supporting the vehicle body and mounted upon a transversely stable support at opposite sides of the vehicle body, adjusting plates arranged to divide said springs into sections of variable resiliency, a rockshaft journaled crosswise of said body, and levers connecting said plates with said rockshaft.

5. A vehicle suspension including, in combination, springs supporting the vehicle body and mounted upon a transversely stable support at opposite sides of the vehicle body, and a controlling device consisting of a rigid yoke member hinged crosswise of said body, and arms reaching from said member to intermediate points of said springs.

6. A vehicle suspension including, in combination, helical springs disposed transversely with relation to an axle of the vehicle, reach bars connecting the axle with the vehicle body, a rigid transverse member mounted to rock upon the vehicle body, and levers operatively connecting said member with said springs at points intermediate of their ends.

7. A vehicle suspension including, in combination, helical springs mounted endwise in planes transverse to an axle of the vehicle, reach bars extending under said springs from the axle to anchorages on the vehicle body, a rigid member substantially at right angles to said reach bars mounted to rock on said body, and levers operatively connecting the springs with said member.

8. A vehicle suspension including, in combination, elastic means disposed at opposite sides of the vehicle and connected with a stable means of support, a stress-transmitting device consisting of a rigid hinge member hingedly supported upon a suspended portion of the vehicle for movement about a transverse axis, said elastic means acting upon the free end of said hinge member in one direction of rotation, and auxiliary elastic means also acting upon the free end of said hinge member in the opposite direction of rotation.

9. A vehicle suspension including, in combination, elastic means disposed at opposite sides of the vehicle and connected with a stable means of support, a stress-transmitting device consisting of a rigid hinge member hingedly supported upon a suspended portion of the vehicle for movement about a transverse axis, said elastic means acting upon the free end of said hinge member in one direction of rotation, and auxiliary elastic means interposed between a suspended portion of the vehicle and the free end of said hinge member and acting upon said hinge member in the opposite direction of rotation.

10. A vehicle suspension including, in combination, elastic means disposed at opposite sides of the vehicle and connected with a stable means of support, a stress-transmitting device consisting of a rigid transverse member mounted to rock upon a suspended portion of the vehicle, and arms extending therefrom and connected at their free ends to said elastic means to be acted upon thereby in one direction of rotation, and auxiliary elastic means acting upon the free ends of said arms in the opposite direction of rotation.

11. A vehicle suspension including, in combination, elastic means disposed at opposite sides of the vehicle and connected with a stable means of support, a stress-transmitting device consisting of a rigid member supported upon a suspended portion of the vehicle for movement about a transverse axis, and arms extending therefrom and connected at their free ends to said elastic means to be acted upon thereby in one direction of rotation, and auxiliary elastic means interposed between a suspended portion of the vehicle and the free ends of said arms and acting thereupon in the opposite direction of rotation.

12. A vehicle suspension including, in combination, elastic means disposed at opposite sides of the vehicle and extending transversely of and connected to a stable means of support extending transversely of the vehicle, a stress-transmitting device consisting of a rigid hinge member supported upon a suspended portion of the vehicle for movement about a transverse axis, said elastic means acting upon the free end of said hinge member in one direction of rotation, and auxiliary elastic means also acting upon the free end of said hinge member in the opposite direction of rotation.

In testimony whereof, I have affixed my signature hereto.

WILLIAM R. WILLIAMS.